(12) United States Patent
Ishibashi

(10) Patent No.: US 7,230,537 B2
(45) Date of Patent: Jun. 12, 2007

(54) PRODUCT IDENTIFICATION SYSTEM USING IC TAG UNITS, AND A DIGITAL CONTENT MANAGEMENT SYSTEM

(75) Inventor: Hiromichi Ishibashi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 235 days.

(21) Appl. No.: 11/103,559

(22) Filed: Apr. 12, 2005

(65) Prior Publication Data

US 2005/0242182 A1 Nov. 3, 2005

(30) Foreign Application Priority Data

Apr. 15, 2004 (JP) ............... 2004-120129

(51) Int. Cl.
*G08B 13/14* (2006.01)
(52) U.S. Cl. .................... 340/572.7; 340/572.8
(58) Field of Classification Search ............ 340/572.7, 340/572.8, 572.3, 572.4, 572.6
See application file for complete search history.

(56) References Cited

U.S. PATENT DOCUMENTS

| | | | | |
|---|---|---|---|---|
| 4,684,930 A | * | 8/1987 | Minasy et al. ........... 340/572.3 |
| 4,746,908 A | * | 5/1988 | Montean ................... 340/572.6 |
| 5,017,907 A | * | 5/1991 | Cordery et al. .......... 340/572.1 |
| 5,457,382 A | * | 10/1995 | Stein .......................... 324/239 |
| 5,594,420 A | * | 1/1997 | Copeland et al. ........ 340/572.3 |
| 6,144,300 A | * | 11/2000 | Dames ..................... 340/572.7 |
| 6,204,766 B1 | * | 3/2001 | Crossfield et al. ....... 340/572.6 |
| 6,323,770 B1 | * | 11/2001 | Dames ..................... 340/572.7 |
| 6,426,700 B1 | * | 7/2002 | Lian et al. ................ 340/572.6 |
| 6,967,578 B1 | * | 11/2005 | Guida ....................... 340/572.3 |

FOREIGN PATENT DOCUMENTS

| | | |
|---|---|---|
| JP | 10-242893 | 9/1998 |
| JP | 11-59040 | 3/1999 |
| JP | 11-215026 | 8/1999 |
| JP | 2000-332842 | 11/2000 |
| JP | 2002-163613 | 6/2002 |
| JP | 2003-317048 | 11/2003 |

* cited by examiner

*Primary Examiner*—John Tweel, Jr.
(74) *Attorney, Agent, or Firm*—Wenderoth, Lind & Ponack, L.L.P.

(57) ABSTRACT

An IC tag unit has an IC unit for storing unique identification information, a first coil operable to produce a first induction current by electromagnetic induction resulting from movement relative to a magnetic field in which north and south poles are separated by a specific distance, a first rectifier operable to produce a first rectified current by rectifying the first induction current, and a regulator operable to generate a specific voltage from the first rectified current and supplying the voltage to the IC unit.

27 Claims, 14 Drawing Sheets

*Fig.9*

IDINF

| SERVER ADDRESS INFORMATION | CONTENT SOURCE ID | MEDIA ID |
|---|---|---|
| 001011 | 111001011 | 1010001100 |

| ADDRESS OF DAMAGED PART | LENGTH OF DAMAGED PART |
|---|---|
| 010010 | 5KB |
| 011100 | 8KB |
| ... | ... |
| 111010 | 4KB |

SPIC

| | |
|---|---|
| 010010 | DATA (5KB) |
| 011100 | DATA (8KB) |
| ... | |
| 111010 | DATA (4KB) |

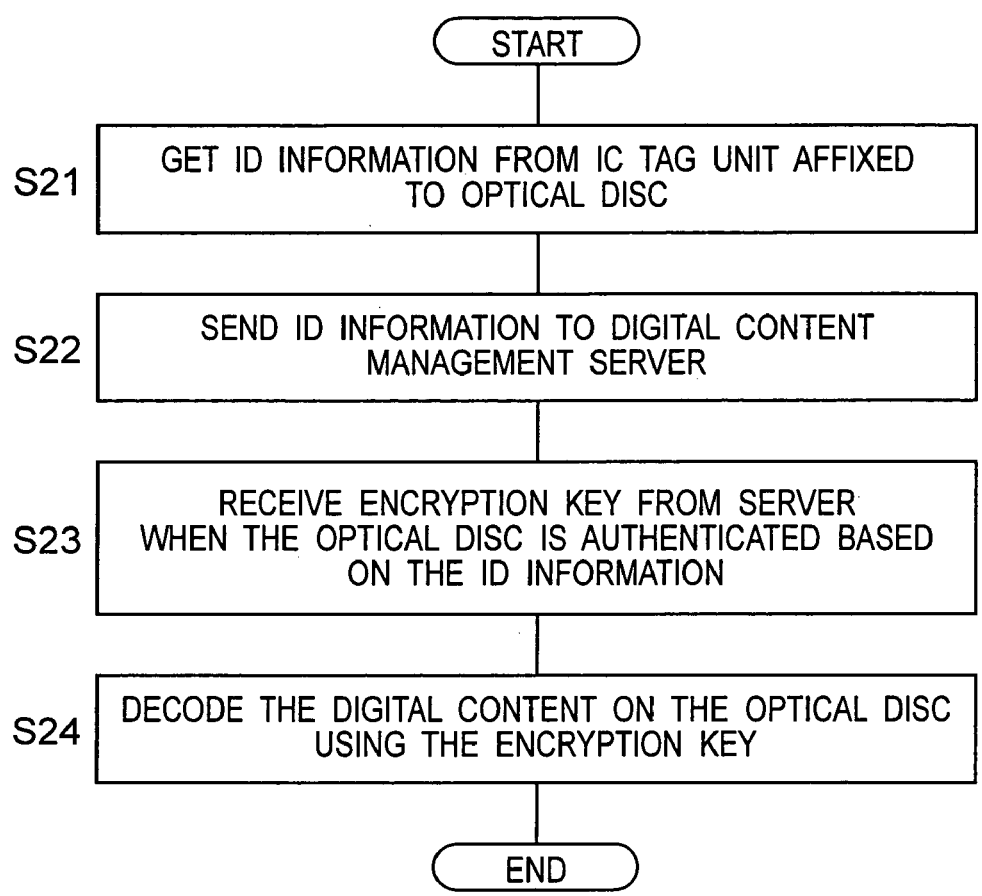

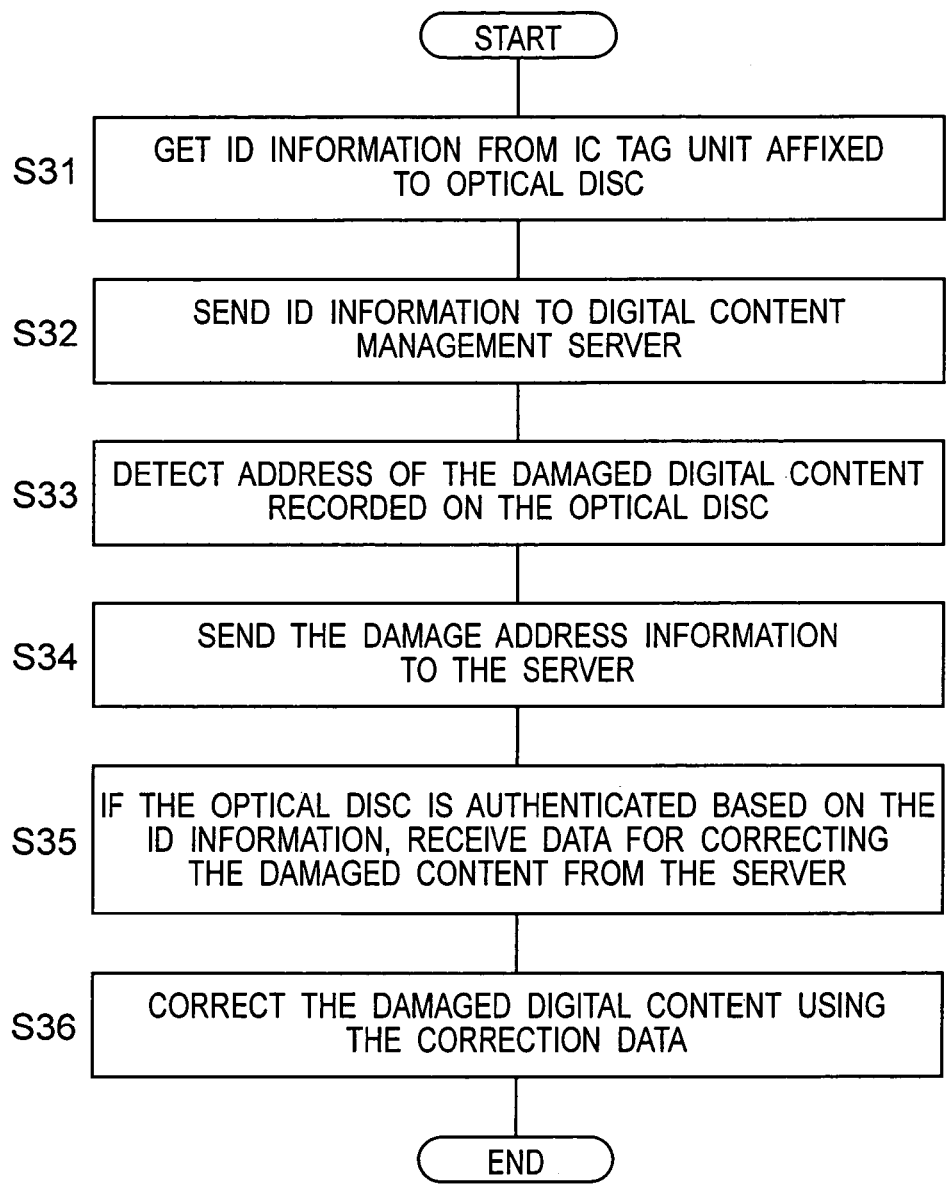

PRODUCT IDENTIFICATION SYSTEM USING IC TAG UNITS, AND A DIGITAL CONTENT MANAGEMENT SYSTEM

BACKGROUND OF THE INVENTION

1. Field of Technology

The present invention relates to a product identification system using IC tag units, and relates more particularly to an identification system for optical discs having an affixed IC tag unit. The invention also relates to a digital content management system for using IC tag units to manage digital content recorded to optical discs.

2. Description of Related Art

Technologies enabling on-line management of products using small electronic circuit units called RF tags or IC tags affixed to individual products are known from the literature. As the cost of these IC tag units has dropped, however, the range of potential applications has increased significantly, leading to a rapid rise in demand.

These IC tag units have a loop antenna, and power sufficient to drive the IC unit is supplied from the antenna as taught in Japanese Patent Laid-open Publication No. H11-59040. Power is typically supplied to the IC tag unit by means of electromagnetic induction of strong electromagnetic waves emitted from an external source to the antenna as taught in Japanese Patent Laid-open Publication No. H10-242893. The dc voltage required for IC operation is acquired by rectifying and smoothing the ac current output from the antenna as taught, for example, in Japanese Patent Laid-open Publication No. H11-215026.

IC tags are primarily used to identify the products to which they are affixed, and the IC tag unit contains ROM for storing information enabling this identification (that is, ID information). When power is supplied to the IC tag this ID information is read and output from the antenna after passing through a modulation and transmission circuit also disposed in the IC tag. Modulation methods include phase shift keying (PSK) as taught in Japanese Patent Laid-open Publication No. 2000-332842.

Japanese Patent Laid-open Publication No. 2002-163613 and Japanese Patent Laid-open Publication No. 2003-317048 also teach using this IC tag technology for identifying and managing individual optical discs. This technology enables encrypting commercial content downloaded for a fee to an optical disc using this ID information as the encryption key, and can thus prevent unauthorized duplication of the downloaded content to another optical disc.

A problem with the foregoing prior art is that cost is a major obstacle to actually using IC tags to individually manage optical discs. More specifically, while the cost of the IC tag units continues to drop, a separate device is needed to produce the strong electromagnetic waves needed to supply power to the IC tag units, and these devices are expensive and large. On the other hand, the cost of the CD-ROM and DVD-ROM drives that are typical optical disc drives is also dropping, and adding such a device for producing electromagnetic waves is completely unrealistic considering current trends in the optical disc drive market.

In addition to this problem of cost, generating strong electromagnetic waves means that an electromagnetic shield is also required, thus creating structural design problems.

DVD drives have also become small enough to fit inside a notebook computer, and further increasing the size of the DVD drive is thus also not practical.

A further problem is that DVD drives with a recording function (such as DVD-RAM drives) are typically used as recorders for recording TV programs, and the electromagnetic waves needed for IC tag unit operation can easily affect reception of TV programs.

An object of the present invention is therefore to provide a product identification system for identifying products bearing an IC tag unit by supplying power to the IC tag unit without using an expensive electromagnetic wave generator requiring measures for protection against electromagnetic interference.

SUMMARY OF THE INVENTION

To achieve the foregoing object, an IC tag unit according to a first aspect of the present invention has: an IC unit operable to store unique identification information; a first coil operable to produce a first induction current by electromagnetic induction resulting from movement relative to a magnetic field in which north and south poles are separated by a specific distance; a first rectifier operable to produce a first rectified current by rectifying the first induction current; and a regulator operable to generate a specific voltage from the first rectified current and supplying said voltage to the IC unit.

Preferably, the first coil moves at a rate of $(10^5 \times d)$ [mm/s] or less relative to a magnetic field in which north and south poles are separated by distance d [mm], and thereby generates a first induction current at a frequency of 100 kHz or less.

Further preferably, the IC tag unit also has a second coil disposed at a specific center-to-center distance from the first coil operable to produce a second induction current by means of electromagnetic induction resulting from movement relative to a magnetic field, and a second rectifier operable to rectify the second induction current and outputting a second rectified current. The regulator generates a specific voltage from a current combining the first rectified current and second rectified current, and supplies the resulting voltage to the IC unit.

Another aspect of the present invention is a product identification system having a spindle motor for rotating a product having an IC tag unit; and a static magnetic field generating means disposed with north and south poles alternating in a circumferential direction near a rotating surface of the product.

A product identification method for identifying products having an IC tag unit comprising an IC unit for storing unique identification information, and a power supply unit operable to supply power to the IC unit by electromagnetic induction, the product identification method having: generating power by means of electromagnetic induction in the power supply unit of the IC tag unit by moving the product relative to a magnetic field in which north and south poles are separated by distance d [mm] at a rate of $(10^5 \times d)$ [mm/s] or less, and transmitting the identification information from the IC unit; and receiving the identification information.

A digital content management method for managing digital content recorded to an optical disc based on identification information uniquely identifying a circulated optical disc by means of an optical disc drive for driving the optical disc, the digital content management method having: a step of acquiring the identification information from an IC tag unit affixed to the optical disc; a step of sending the identification information to a digital content management server; a step of acquiring an encryption key sent from the server for decrypting the digital content when the server determines that the optical disc is authentic based on the identification information; and a step of decoding digital content recorded to the optical disc using the encryption key.

A digital content management method according to another aspect of the invention for managing digital content recorded to an optical disc based on identification information uniquely identifying a circulated optical disc by means of an optical disc drive for driving the optical disc has: acquiring the identification information from an IC tag unit affixed to the optical disc; sending the identification information to a digital content management server; detecting address information relating to defective parts of the digital content recorded to the optical disc; sending the address information relating to defective parts of the digital content to the server; receiving correction data sent from the server for correcting the defective part when the server authenticates the optical disc based on the identification information; and correcting the digital content recorded to the optical disc using the correction data.

A product identification system and product identification method using an IC tag unit according to the present invention generates power from an induction current produced by electromagnetic induction resulting from movement relative to a static magnetic field, and supplies the generated power to the IC tag unit. The resulting product identification system is thus compact and inexpensive and does not require protection against electromagnetic interference, and will not produce electromagnetic interference in other devices.

By using two coils disposed with a specific center-to-center distance therebetween, an IC tag unit according to one aspect of the invention can shift the phase of the induction currents produced in the two coils by relative movement to the magnetic field. The induction currents produced by the two coils can then be rectified and combined to produce a smooth supply current to drive the IC unit stably.

The digital content management method of this invention acquires identification information from an IC tag unit affixed to a particular optical disc, sends the identification information to a digital content management server, receives an encryption key from the server, and then uses this key to decode the digital content. Optical discs can thus be uniquely identified, and digital content can be easily managed.

A digital content management method according to another aspect of this invention acquires identification information from an IC tag unit affixed to a particular optical disc and sends the identification information to a digital content management server, detects address information for defective parts of the digital content recorded to the optical disc and sends this address information to the server, then receives correction data for correcting the damaged part of the digital content from the server, and corrects the damaged part of the digital content using the received correction data. A digital content management service that is not possible with the prior art can thus be provided so that when the optical disc is damaged the digital content in the damaged part of the disc can be corrected and reproduced.

Other objects and attainments together with a fuller understanding of the invention will become apparent and appreciated by referring to the following description and claims taken in conjunction with the accompanying drawings.

BRIEF DESCRIPTION OF THE DRAWINGS

The present invention will become readily understood from the following description of preferred embodiments thereof made with reference to the accompanying drawings, in which like parts are designated by like reference numeral, and in which:

FIG. 9 shows an example of the identification information signal IDINF in a digital content management system according to the second embodiment of the present invention;

FIG. 10 shows the relationship between damage and correction information in a digital content management system according to the third embodiment of the present invention;

FIG. 13 is a flow chart of the digital content management method according to a second embodiment of the present invention; and FIG. 14 is a flow chart of the digital content management method according to a third embodiment of the present invention.

DESCRIPTION OF THE PREFERRED EMBODIMENTS

Figure 1:
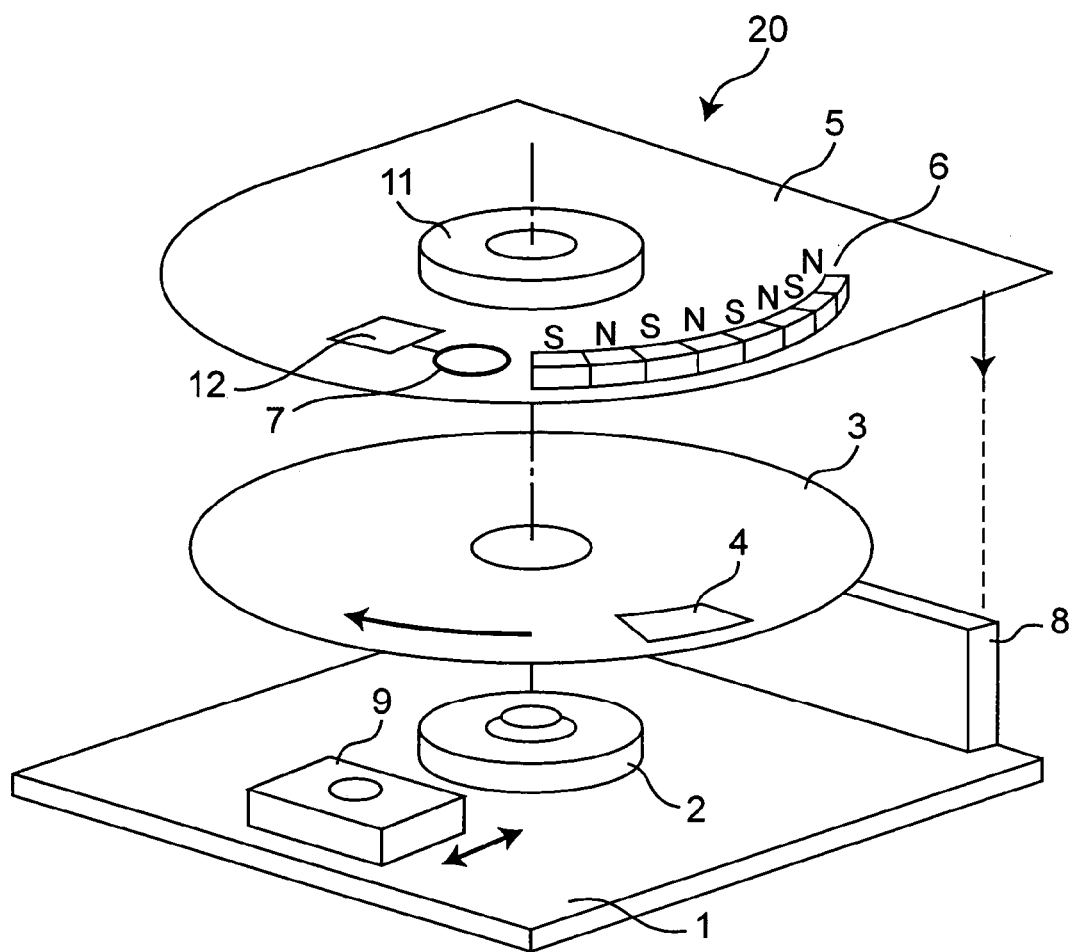
FIG. 1 is an oblique schematic view showing the arrangement of an optical disc drive according to a first embodiment of the present invention.

Preferred embodiments of the present invention are described below with reference to the accompanying figures. Note that like parts are identified by like reference numerals in the figures.

Embodiment 1

FIG. 1 is an oblique schematic view showing the arrangement of an optical disc drive 20 according to a first embodiment of the present invention.

As shown in FIG. 1, this optical disc drive 20 has a spindle motor 2 for rotationally driving the optical disc 3, a damper 11 for clamping the optical disc 3 to the spindle motor 2, an optical head 9 for emitting a laser beam to the optical disc 3, and a top plate 5 having a plurality of stationary permanent magnets 6 with alternating north and south poles disposed near the rotating surface of the optical disc 3 in the circumferential direction of the rotating disc surface.

The optical head 9 is disposed on the base plate 1 so that the optical head 9 can move radially to the optical disc 3. The spindle motor 2 is fixed on the base plate 1. The top plate 5 is disposed and positioned to the base plate 1 by an intervening support member 8. When loading and unloading an optical disc 3, the top plate 5 moves up and down, and after a optical disc 3 is loaded, the top plate 5 descends to a fixed position so that the optical disc 3 is clamped between the damper 11 and spindle motor 2.

A reception circuit 12 for receiving wirelessly transmitted ID information through the sensor antenna 7 is also disposed on top of the top plate 5. The laser beam from the optical head 9 is emitted to one side of the optical disc 3, and an IC tag unit 4 is affixed to the opposite side of the optical disc 3. This IC tag unit 4 is composed of an IC unit and a coil or other power supply unit.

When this optical disc drive 20 drives the optical disc 3 rotationally, the IC tag unit 4 passes through the static magnetic field formed by the magnets 6 disposed in an arc on the top plate 5. This produces an induction current in the coil that is the power supply unit of the IC tag unit 4 by means of electromagnetic induction. Power is thus supplied to the IC unit, the ID information is read from the IC unit, and the ID information is transmitted using the same coil as an antenna. The reception circuit 12 of the optical disc drive 20 receives this wirelessly transmitted ID information through the sensor antenna 7 and the optical disc can thus be identified.

Figure 6:
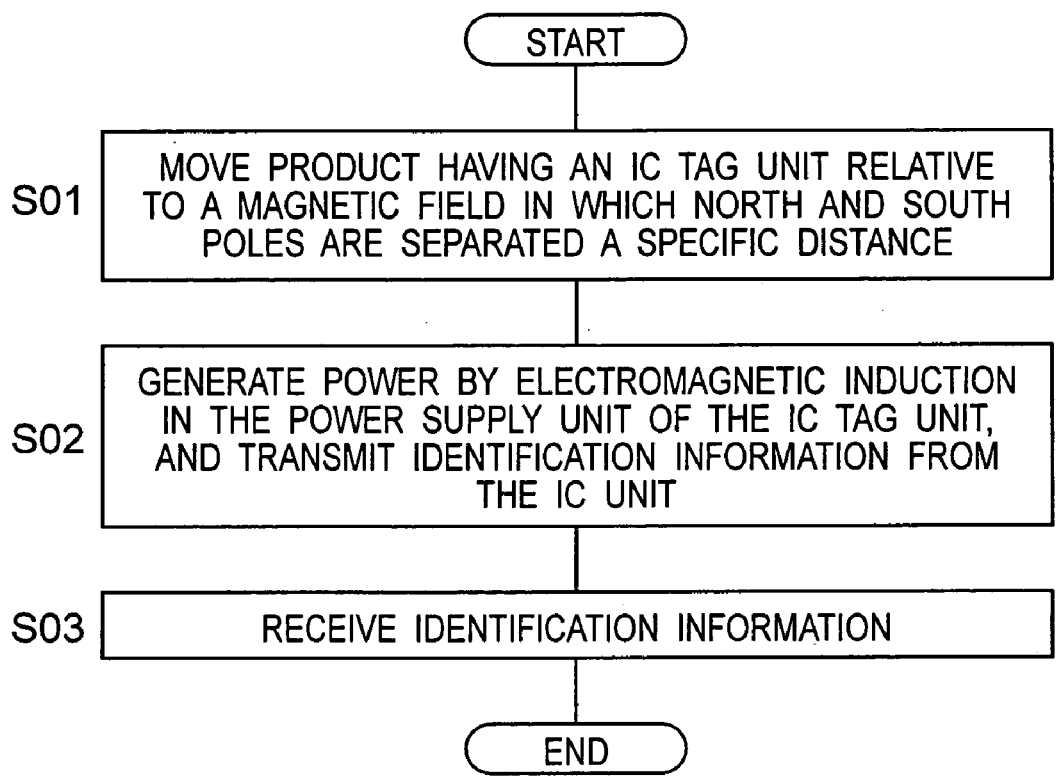
FIG. 6 is a flow chart of a product (optical disc) identification method in the first embodiment of the present invention.

FIG. 6 is a flow chart of the method of identifying the product to which this IC tag unit 4 is affixed. In this example the product is the optical disc 3.

(a) Move an optical disc 3 bearing an IC tag unit 4 in relation to a magnetic field in which the south and north poles are separated (S01). More specifically, the optical disc is moved rotationally in an optical disc drive 20 as shown in FIG. 1. Thus moving the optical disc 3 rotationally saves space because the space required to move the disc relatively to the magnetic field can be limited to the minimum space required to hold the optical disc 3 itself.

(b) Generate power by means of electromagnetic induction by the coil (power supply unit) of the IC tag unit 4, and output the ID information from the IC unit (S02).

(c) The ID information is then received by the reception circuit 12 through the sensor antenna 7 of the optical disc drive 20.

Figure 7:
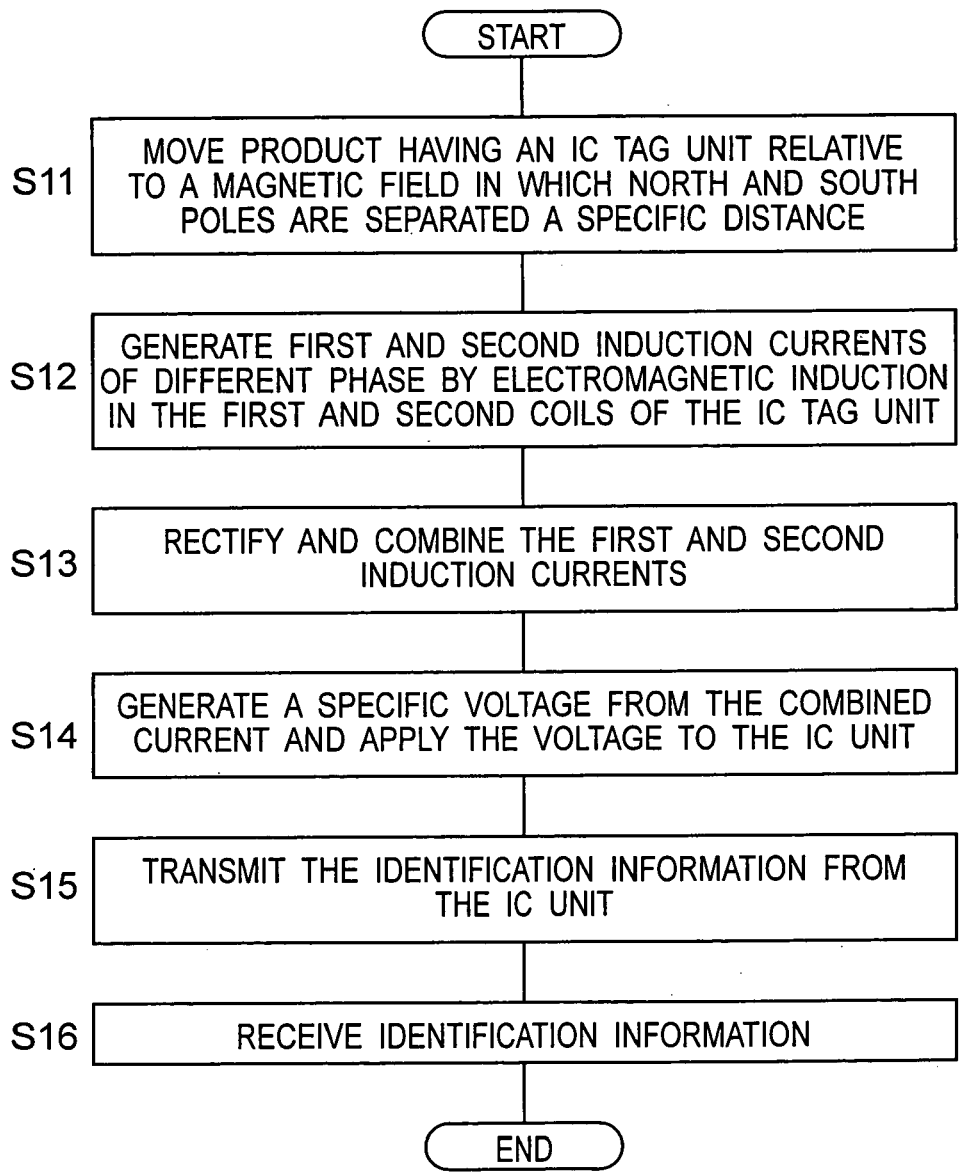
FIG. 7 is a flow chart of another product (optical disc) identification method in the first embodiment of the present invention.

FIG. 7 is a flow chart of a method of identifying products bearing an IC tag unit 4 having two coils disposed to the IC tag unit so that the centers of the area of each coil are offset a specified distance. The products are again assumed to be optical discs 3.

(a) Move an optical disc 3 bearing an IC tag unit 4 in relation to a magnetic field in which the south and north poles are separated (S11).

(b) First and second induction currents of opposite phase are produced by electromagnetic induction in the first coil 41 and second coil 42 of the IC tag unit (S12). As described more fully below, the phase of the induction currents can be shifted by disposing the two coils so that the centers of the area of each coil are offset a specific distance.

(c) Rectify and add the first and second induction currents (S13). Because these induction currents have a different phase as described above, the waveform of the combined current resulting from rectifying and combining the induction currents can be effectively smoothed.

(d) Generate a specific voltage from the combined current and apply the voltage to the IC unit 40 (S14). The IC unit can be stably driven by applying the voltage generated from the smoothed currents to the IC unit.

(e) Output the ID information from the IC unit 40 (S15).

(f) The reception circuit 12 then receives the ID information through the sensor antenna 7 of the optical disc drive 20 (S16).

Figure 2:
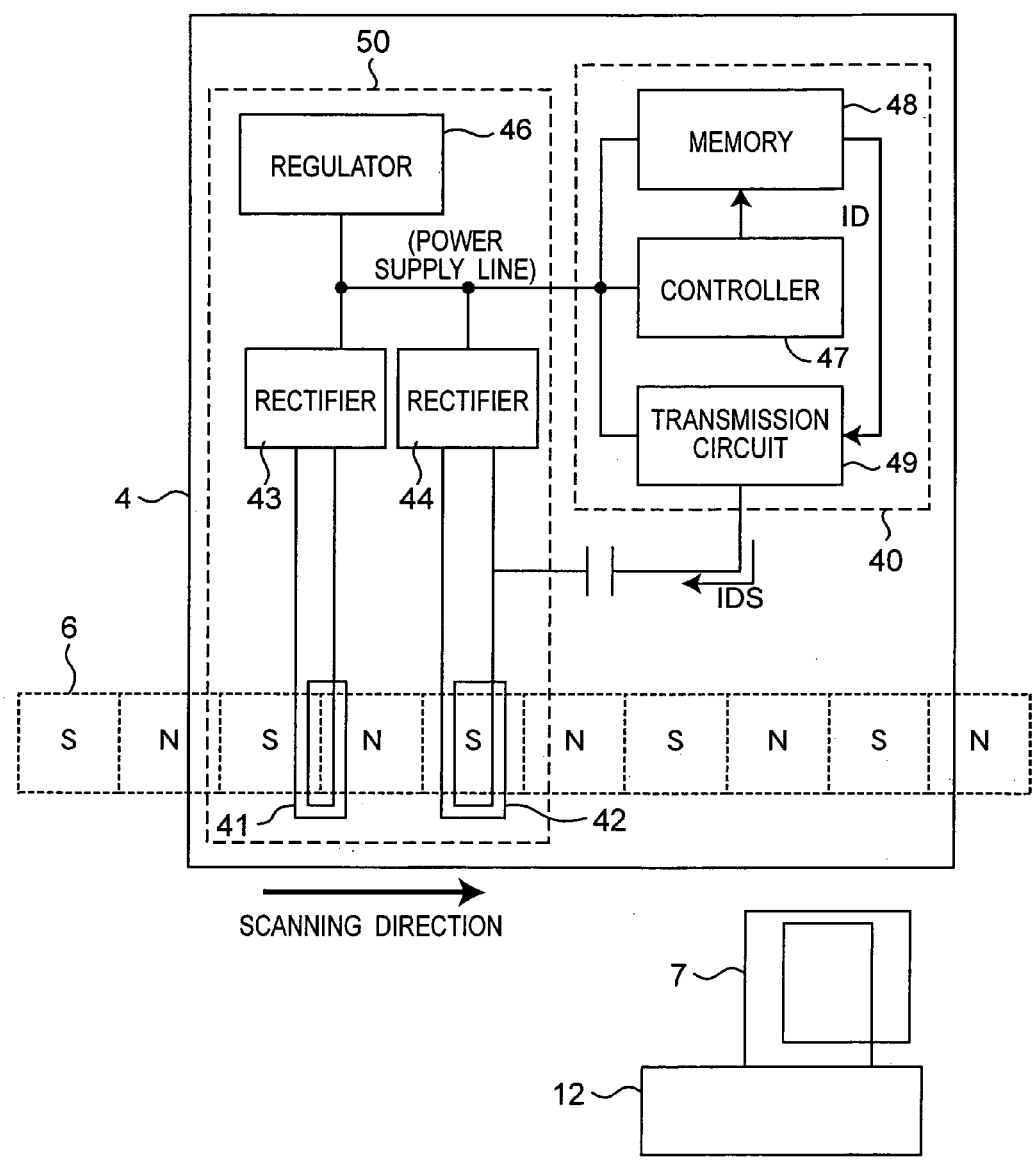
FIG. 2 is a block diagram showing the arrangement of an IC tag unit, and the relative positions of the power supply unit of the IC tag unit and the magnets of the optical disc drive, in a first embodiment of the invention.

The method of identifying an optical disc 3 having an affixed IC tag unit 4 is further described below with reference to FIG. 2. FIG. 2 is a schematic diagram showing the arrangement of the IC tag unit 4 and the relative positions of the IC tag unit 4 and magnets 6. The IC tag unit 4 is composed of an IC unit 40 and a power supply unit 50. The IC unit 40 has a controller 47, memory 48, and transmission circuit 49. The power supply unit 50 has a coil 41, coil 42, rectifiers 43, 44, and a regulator 46.

Unique ID information is stored in the memory 48 of the IC unit 40. When specific power is supplied from the power supply unit 50, the controller 47 reads the ID information from the memory 48, and outputs the ID information from the transmission circuit 49 using the coil 42 as an antenna.

The power supply unit 50 produces first and second induction currents in the first and second coils 41, 42 as a result of the IC tag unit 4 moving through the static magnetic field, rectifies and combines the induction currents by means of the rectifiers 43, 44, and thus generates a specific voltage by means of the regulator 46 for supply to the IC unit. Note that the combination of this IC unit 40 and the power supply unit 50 containing a coil (antenna) may be called an IC tag unit, an IC tag, an RF tag, or even a wireless tag.

Figure 3:
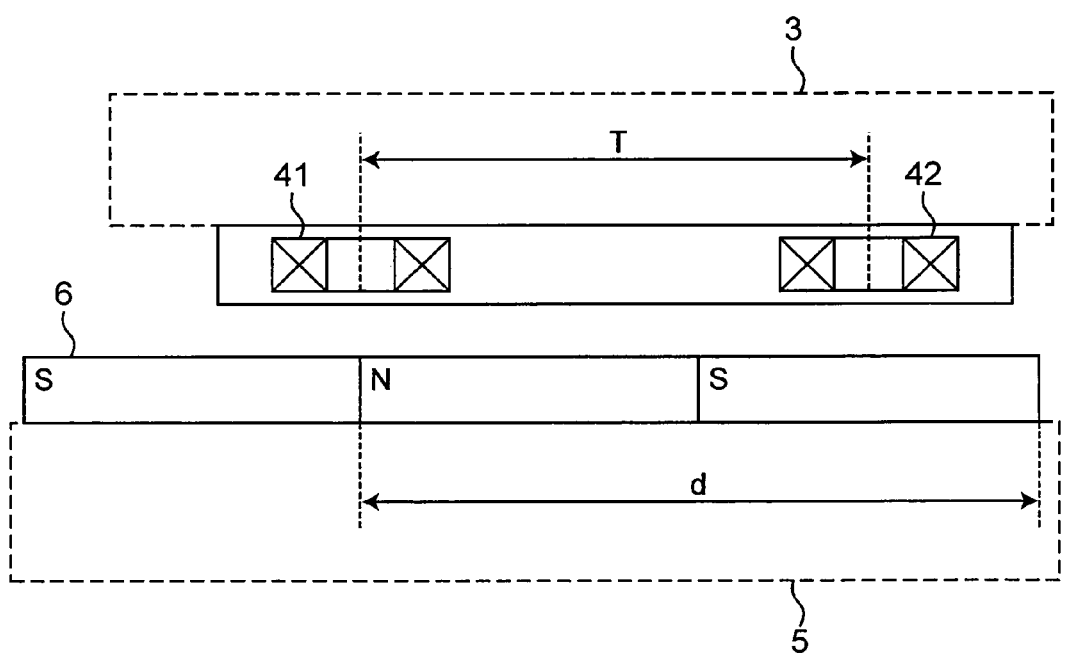
FIG. 3 is a schematic diagram showing the relative positions of the two coils of the IC tag unit and the magnets producing a static magnetic field in a first embodiment of the invention.

FIG. 3 shows the relative positions of the first and second coils 41, 42 and the magnets 6. The coils 41, 42 are disposed with a specific center-to-center distance between the coils as described above. The two coils 41, 42 are also disposed opposite the magnets 6 on the top plate 5, and sequentially move through the magnetic fields produced by the magnets 6 as the optical disc 3 rotates. This produces first and second induction currents I1 and I2 by means of electromagnetic induction in the first and second coils 41, 42.

Figure 4:
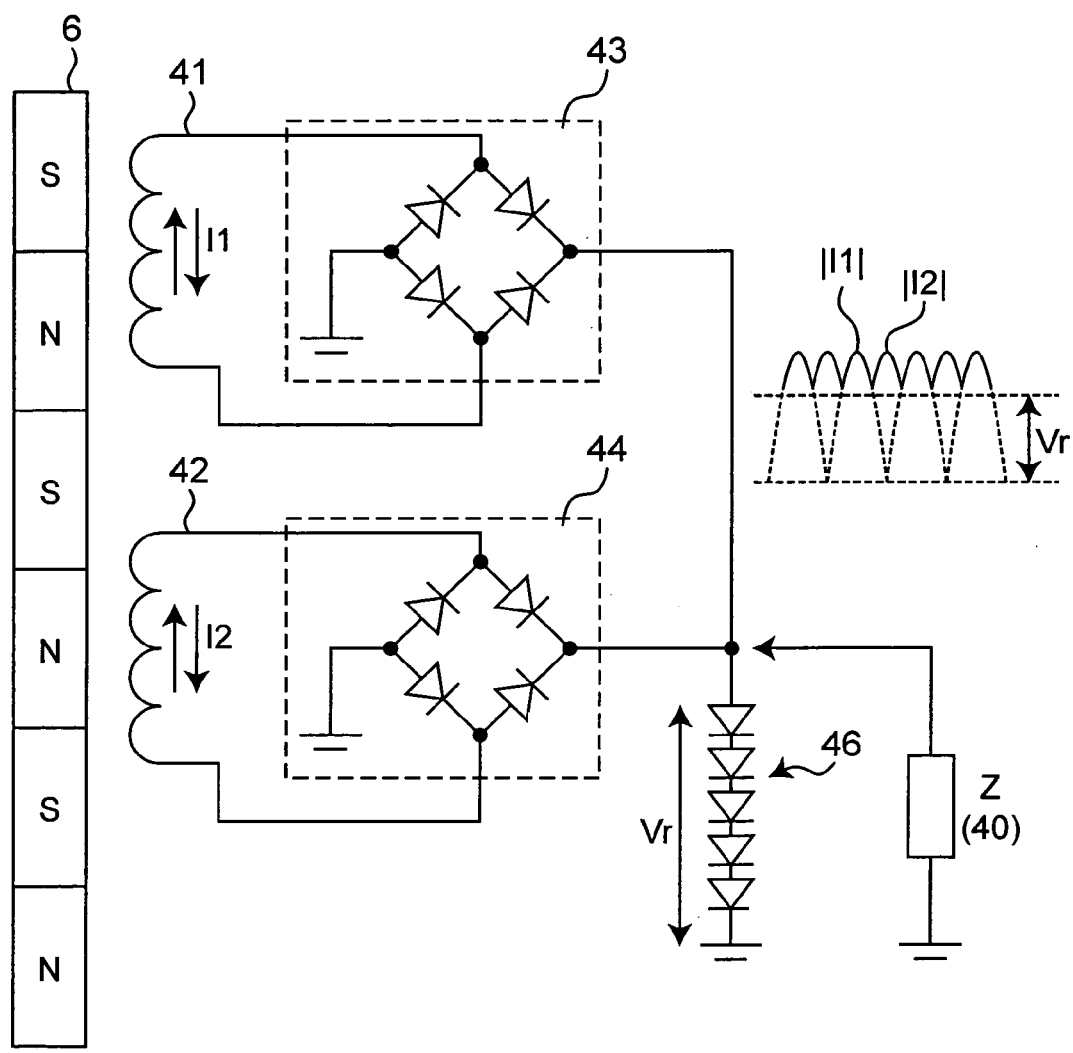
FIG. 4 is a circuit diagram of the power supply unit of an IC tag unit according to the first embodiment of the present invention.

FIG. 4 is a circuit diagram showing the arrangement of the power supply unit 50 in the IC tag unit 4 shown in FIG. 2. The rectifiers 43, 44 are each composed of four diodes. The regulator 46 is composed of a plurality of diodes connected in series with one end grounded. The part of the coil 42 used as an antenna is not shown in this figure.

The specific arrangement whereby the first and second induction currents I1 and I2 are rectified, combined, converted to a specific voltage, and supplied as power to the load (Z), that is, IC unit 40, is described next below.

The first and second induction currents I1 and I2 produced by electromagnetic induction in the first and second coils are described by the following equations.

$$I1 = \sin(2\pi ft)$$

$$I2 = \sin(2\pi ft + \tau)$$

where f is the frequency of the induction current and τ is the phase difference between the first induction current and second induction current. This frequency f is defined as $$f = V/d$$

where V [mm/s] is a relative velocity at which the IC tag unit 4 affixed to the optical disc 3 traverses the static magnetic field, and d [mm] is the length of the magnetic bodies (each pair of north and south poles) in the magnet 6 forming the static magnetic field.

Therefore, if V=10 m/s (=10⁴ mm/s) and d=2.5 mm, for example, then:

f=4 kHz.

The resulting induction currents are then full-wave rectified by the rectifiers 43, 44, resulting in a first induction current with the dc component |I1| and second induction current with the dc component |I2|. These induction currents are then combined, and the regulator 46 then produces and supplies a specific voltage from the combined current to the IC unit 40 as power.

The voltage waveform supplied to the IC unit 40 is described next below.

If there is only one coil, the negative sine wave component is reflected on the positive component side of the time axis, and the combined current wave thus has repeated peaks and valleys. The voltage waveform resulting therefrom is thus also a repeated pattern of peaks and valleys. The valleys in this voltage waveform of repeated peaks and valleys drop below specific voltage Vr, and driving the IC unit 40 stably is thus difficult.

Furthermore, when two coils are disposed together, the voltage waveform is a waveform of repeated peaks and valleys similar to the voltage waveform derived from a single coil even if the two coils are disposed as above and the induction currents therefrom are rectified and combined.

We discovered, however, that the current waveform can be smoothed by shifting the phase when combining the waveforms of the two induction currents with repeating peaks and valleys. More specifically, the current waveform can be smoothed by combining the first and second induction currents I1 and I2 so that the phase difference τ therebetween is 90° or 270°. This phase difference τ can be generally defined as (180°×n+90°) where n is an integer, and setting the phase difference to 90° or 270° is thus not always necessary. By shifting the phase difference between the induction currents 180° or a multiple thereof (180°×n), the peaks and valleys in the combined induction currents can be mutually overlaid. The phase difference τ between the first and second induction currents I1 and I2 produced by the coils 41, 42, respectively, is therefore controlled so that the following relationship is true.

$$180° \times n + 1/6 <= \tau <= 180° \times n + 5/6$$

(that is, in a range of 30° to 150° or 210° to 330°).

Further preferably, the phase difference τ is:

$$180° \times n + 1/4 <= \tau <= 180° \times n + 3/4$$

(that is, in a range of 45° to 135° or 225° to 315°).

Yet further preferably, the phase difference τ is:

$$180° \times n + 1/3 <= \tau <= 180° \times n + 2/3$$

(that is, in a range of 60° to 120° or 240° to 300°).

Further alternatively, three coils could be disposed at a 120° phase shift, or four or more coils could be arranged to produce a desired phase difference in the induction currents output by the coils.

A specific arrangement for controlling the phase difference τ between the first and second induction currents I1 and I2 to within the above ranges is described below. The phase difference τ between the first and second induction currents I1 and I2 is $$\tau = 180° \times (T/d)$$

where T is the distance between the centers of the two coils 41, 42, and d is the distance between the north and south poles of each magnetic body in the magnet 6 forming the static magnetic field.

Therefore, to achieve a phase difference τ of (180°×n+ 90°) (where n is an integer), the center distance T between the two coils 41, 42 is as follows.

$$T=(n+1/2) \times d$$

Because the bottom of the first induction current |I1| and the peak of the second induction current |I2| are added, the combined current is smoothed. Note that the regulator 46 can be used to cut fluctuation of voltage Vr or greater in the remaining ripple component.

The distance T between the centers of the coils 41, 42 is ideally [(n+½)×d], and this allows for some tolerance in the placement of the coils 41, 42. For example, if the distance T between the centers of the coils 41, 42 is in the following rang $$(n+1/6) \times d <= T <= (n+5/6) \times d$$

the residual ripple component can still be suppressed to a practical usable level.

The distance T between the centers of the coils 41, 42 is further preferably in the range $$(n+1/4) \times d <= T <= (n+3/4) \times d$$

and yet further preferably in the following range.

$$(n+1/3) \times d <= T <= (n+2/3) \times d$$

The reason why two complementary coils 41, 42 are thus used is due to the fundamental concept of the present invention. More specifically, the arrangement of the prior art as described above provides a separate means of generating the electromagnetic field and can thus control the frequency of the electromagnetic field to a desirably high frequency of 13.56 MHz, for example. The method of the prior art can thus easily smooth the rectification current by adding a small capacitor in the IC tag unit without using the above-described arrangement of the present invention.

Drive power is derived in this embodiment of the present invention from the induction current produced by rotation of the optical disc 3, however, and the frequency is therefore a low 4 kHz. Smoothing this induction current using a capacitor of a size that can be disposed inside the IC tag unit 4 cannot sufficiently remove the ripple component, however, and thus results in undesirable overhead, that is, operation of the IC unit 40 must therefore be paused during the intervals in which power is not supplied. However, placing the two coils 41, 42 at complementary positions at a specific center-center distance T enables desirably smoothing the rectification current without using a large capacitor.

The distance d between the north and south poles of the magnetic bodies in the magnet 6 producing the static magnetic field in this optical disc drive 20 is described next below. So that the phase difference τ of the first and second induction currents I1 and I2 produced by the two coils 41, 42 of the IC tag unit 4 can be controlled to within the above-defined range, the distance d between the north and south poles is preferably within the range $$T/(n+1/6) <= d <= T/(n+5/6)$$

where T is the center-center distance between the coils 41, 42 of the IC tag unit 4 and n is an integer.

Further preferably, the distance d between the north and south poles is in the range $$T/(n+1/4)<=d<=T/(n+3/4)$$

and yet further preferably is in the range $$T/(n+1/3)<=d<=T/(n+2/3).$$

The center-center distance T between the coils 41, 42 of the IC tag unit 4 and the distance d between the north and south poles of the magnetic bodies in the magnets 6 producing the static magnetic field in this optical disc drive 20 are therefore preferably set so that the foregoing relations are true.

Figure 5:
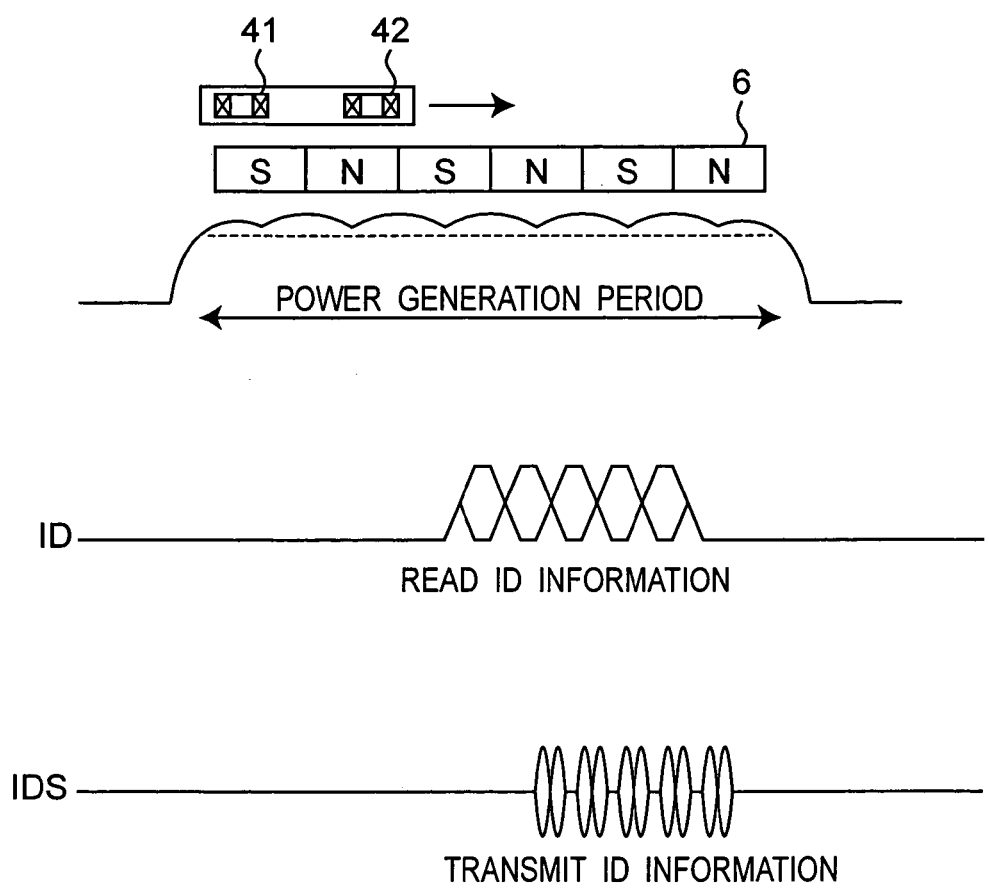
FIG. 5 is a timing chart describing the operation of an IC tag unit according to the first embodiment of the present invention.

Operation of the IC unit 40 is described next with reference to FIG. 2 and FIG. 5. The IC unit 40 starts operating when power is supplied from the power supply unit 50.

(a) The controller 47 activates and starts accessing the memory 48.

(b) The ID information (ID) is then read from the memory 48 and sent to the transmission circuit 49.

(c) The transmission circuit 49 then converts this ID information to a modulated signal suitable for wireless transmission (using phase-shift keying (PSK), for example) and wirelessly broadcasts the signal. The second coil 42 is used as an antenna in FIG. 2.

The foregoing process is executed while the specific voltage Vr is applied to the IC unit 40.

The reception circuit 12 of the optical disc drive 20 thus senses and receives this wirelessly broadcast ID information (IDS). The sensor antenna 7 is disposed near the magnets 6 as shown in FIG. 1. More specifically, the sensor antenna 7 is a loop antenna with an approximately 10 mm diameter in this embodiment of the invention.

The frequency used for wireless transmission from the IC tag unit 4 is preferably 1 MHz or higher. A lower frequency is desirable from the standpoint of power consumption, but the transmission rate, size of the sensor antenna 7, and cost considerations necessitate a certain frequency. More specifically, if the transmission frequency is 1 MHz and PSK modulation of L=10 (10 cycles per bit) is used, 10 μs is needed to transfer one bit, and 1 ms is needed to transfer 100 bits. In other words, if the optical disc 3 relates at a linear velocity of 10 m/s, the IC tag unit 4 travels relatively 1 ms×10 m/s=10 mm during the time required to transmit 100 bits of data. If the signal output from the IC unit 40 is to be captured without loss, a sensor antenna 7 of approximately 10 mm or more in diameter is sufficient. The sensor antenna 7 is also preferably as small as possible, and this diameter of approximately 10 mm is therefore considered the maximum desirable diameter.

The ID information signal (IDS) received by the sensor antenna 7 is then decoded by the reception circuit 12. The specific configuration of the reception circuit 12 is omitted here other than to note that a normal PSK demodulation means that multiplies the above PSK signal by a carrier signal (of the same frequency as the transmission frequency, and therefore 1 MHz in this embodiment) and then filters the low frequency component can be used.

As described above, this embodiment of the invention simply spins the optical disc 3 through a static magnetic field to produce an induction current using the electromagnetic induction of coils 41, 42 in the IC tag unit 4 affixed to the optical disc 3, and supplies power to the IC unit 40 based on this induction current. Our invention can thus drive an IC tag unit 4 stably at a very low cost without requiring protection against electromagnetic interference.

(Second Embodiment)

Figure 8:
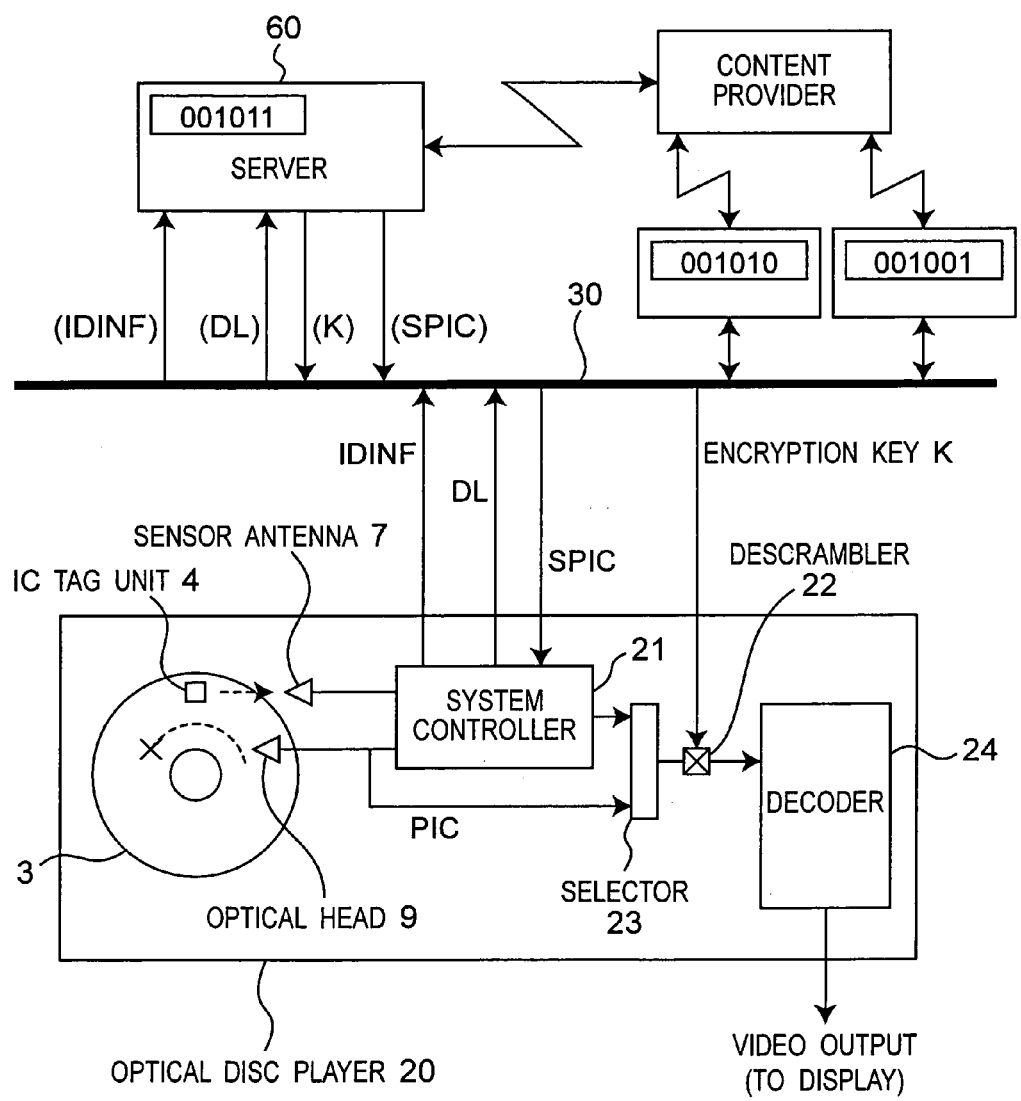
FIG. 8 is a block diagram showing the arrangement of a digital content management system in the second and third embodiments of the present invention.

FIG. 8 is a schematic block diagram showing the arrangement of a digital content management system according to a second embodiment of the present invention.

As shown in FIG. 8 this optical disc drive 20 (optical disc player) has an optical head 9, a sensor 7 (sensor antenna) for detecting an ID information signal IDS output from the IC tag unit 4 affixed to an optical disc 3, a system controller 21, selector 23, descrambler 22, and decoder 24. The optical disc drive 20 is also connected to the Internet 30, and can access a server 60 over the Internet 30.

The server 60 issues an encryption key K for decrypting the digital content when the optical disc 3 is authenticated. A content provider could alternatively own the encryption key K and supply the encryption key K to the server 60 as needed.

The arrangement of the IC tag unit 4 is as described in the foregoing first embodiment of the invention.

This digital content management system detects ID information (ID information signal IDS) transmitted wirelessly from the IC tag unit 4 affixed to each optical disc 3, sends an identification information signal IDINF converted from the ID information signal IDS to the server 60, receives the encryption key K from the server 60 in response, and then decodes and plays back the digital content recorded to the optical disc 3 using this encryption key.

The digital content management method in this aspect of the invention is described next below with reference to FIG. 11, a schematic block diagram describing this digital content management method. An optical disc 3 legally purchased from a content provider is assumed to contain a pre-recorded video program. The video program is the signal (PIC) read by the optical head 9 and reproduced for viewing. This video program is normally encrypted, and therefore cannot be reproduced as a video program without being decrypted in real time by the descrambler 22 using the encryption key K. This encryption key K is issued by the server 60 when the optical disc 3 is verified as an authorized copy. Therefore, the digital content management method of the present invention reads the ID information signal IDS output from the IC tag unit 4 affixed to the optical disc 3, sends this ID information signal IDS over the Internet to the server 60, receives the encryption key K, and then decrypts and reproduces the video program using the provided encryption key K.

FIG. 13 is a flow chart of this digital content management method.

(a) The optical disc player first acquires the identification information (optical disc ID information signal IDS) from the IC tag unit 4 affixed to the optical disc 3 (S21). This optical disc ID information signal IDS is acquired from the IC tag unit 4 using the method described above in the first embodiment of this invention.

(b) The player then sends the ID information over the Internet 30 to the digital content (rights) management server 60 (S22). The system controller 21 converts the ID information signal IDS to the identification information signal IDINF in a format suitable for transmission over the Internet 30, and then outputs the identification information signal IDINF over the Internet 30 to the server 60 (FIG. 11). As shown in FIG. 9, for example, the identification information signal IDINF contains the server address, content source ID, and a media ID each assigned to specific bits.

(c) The server 60 interprets the identification information signal IDINF to determine if the information is valid data sent from the IC tag unit 4. If the identification information signal IDINF is validated and if the optical disc 3 is thus verified as an authentic copy (that is, a legally purchased product), the server 60 returns the encryption key K over the Internet 30 to the disc player (S23).

(d) The digital contents recorded on the optical disc 3 is then decrypted using the received encryption key K (S24). More specifically, the descrambler 22 of the optical disc drive 20 decrypts the contents using the encryption key K, sequentially supplies the video program signal PIC to the decoder 24, and the decoder 24 then decodes and reproduces the video and audio contents for presentation.

The server address is the address of the server 60 accessed by the optical disc drive 20 in which the optical disc 3 identified by the ID is loaded. In the case of video contents, the contents provider may distribute the same title around the world, it is worried that concentrating access from all potential users on a single content provider server will occur. To avoid such a case the contents can thus be managed more efficiently using servers assigned to specific domains based on language, region, or other factors. An international code could be assigned to discs based on the country of distribution so that, for example, the international code 001011 is assigned to optical discs distributed in Japan and the code 001010 in Korea. The optical disc player 20 in which the optical disc 3 with this code is mounted then accesses a specific domain server. The server 60 addressed by the code 001011 is accessed by way of example in this embodiment.

The content source ID means an identification code for the manufacturer of the video program. The media ID means an ID code individually assigned to each optical disc. The content source ID and media ID could also be encrypted. The encryption key K in this case is stored by the content provider or the domain servers 60.

This embodiment of the invention thus sends an ID information signal IDS output from a IC tag unit 4 affixed to the optical disc 3 over the Internet 30 to a domain server 60, thus enabling the server 60 to determine if the optical disc 3 is an authorized copy. The server 60 returns permission to reproduce the video program only when the ID information signal IDS is verified, and the video content can thus be desirably protected.

(Embodiment 3)

Figure 12:
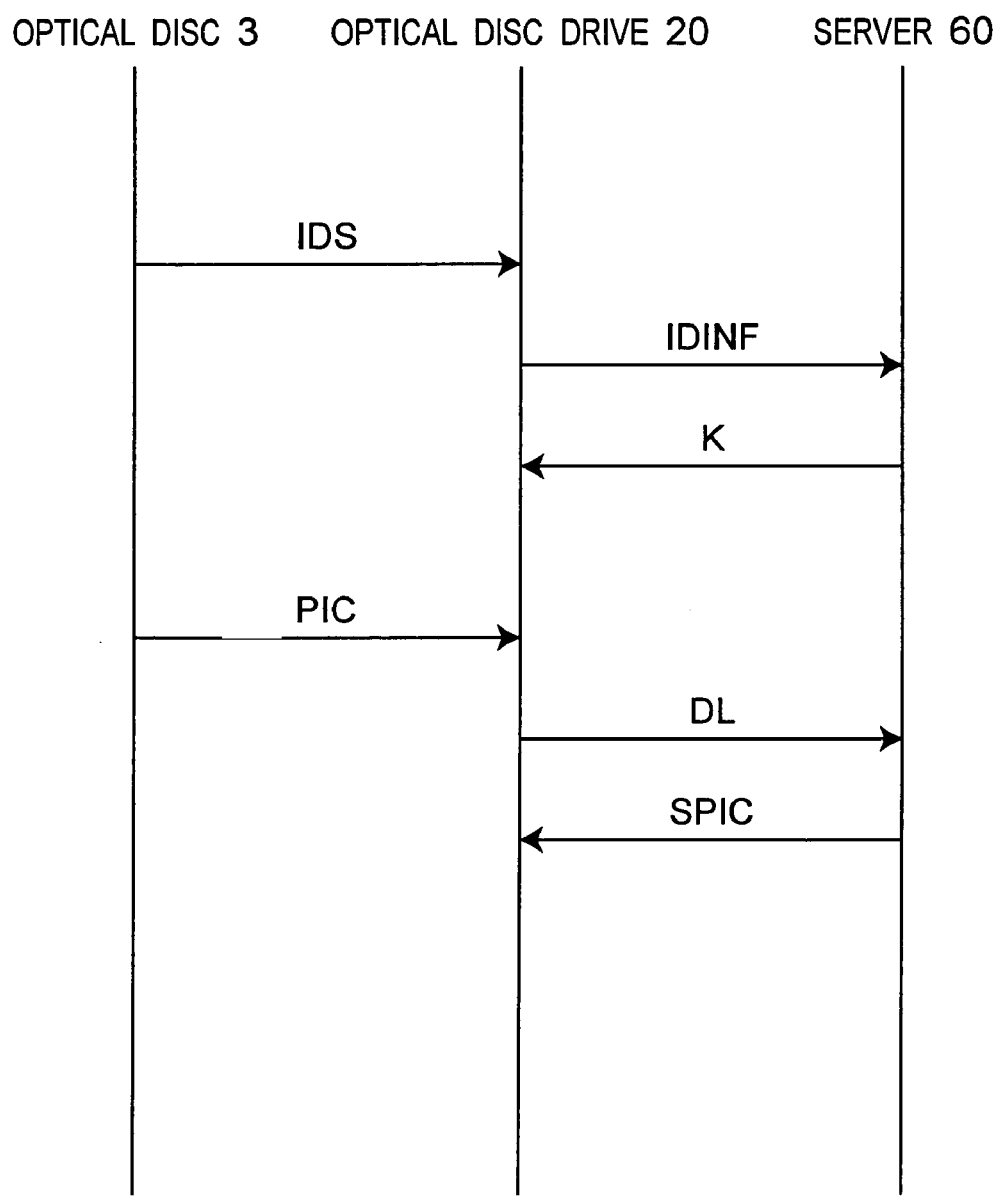
FIG. 12 is a timing chart of the digital content management method according to the third embodiment of the present invention.

FIG. 12 is a timing chart of a digital content management method according to a third embodiment of the invention. This digital content management method differs from the foregoing management method of the second embodiment in the ability to compensate for damage to the digital content from a scratch on the surface of the optical disc 3, for example. When a part of the digital content is thus damaged, correction data for correcting the damaged part is received over the Internet 30 from the server 60 and used to compensate for the damage. The configuration of this digital content management system, specifically the arrangement of the optical disc drive 20 and server 60, is the same as shown in FIG. 8 and described above.

This digital content management method enables providing new, previously unavailable services. The server 60 can determine whether an optical disc 3 is a legal copy based on the ID information signal IDS output from the IC tag unit 4 affixed to the optical disc 3. Specific services can thus be provided for individual verifiable optical discs 3 connected to the Internet 30 or other network. For example, optical discs 3 are generally used without a cartridge (that is, "bare"), and the surface is therefore easily scratched from normal contact with fingernails, furniture, and other objects. When the scratch is large the content often cannot be reproduced using error correction, and a playback error thus results.

Furthermore, as optical disc recording technologies have advanced, disc density has increased from CDs to DVDs and next-generation DVD technologies such as Blu-Ray discs, and as image quality has improved, the thickness of the transparent protection layer on the outside surface has also decreased from 1.2 mm to 0.6 mm and 0.1 mm, thus making the disc more susceptible to surface scratches. As the image quality of recordable content improves, the optical discs used to record the content are thus also more easily scratched and playback errors thus occur more easily.

This aspect of the invention solves this problem by sending the address of the damaged part of the digital content recorded to a damaged (scratched) optical disc 3 to the server 60 together with the ID information signal IDS. The content provider or server 60 then returns information for correcting the damaged part of the disc content to the optical disc drive 20, and the optical disc drive 20 uses this correction data to correct and reproduce the damaged part of the digital content.

FIG. 14 is a flow chart of the digital content management method in this embodiment of the invention.

(a) The optical disc player 20 first acquires the identification information (optical disc ID information signal IDS) from the IC tag unit 4 affixed to the optical disc 3 (S31).

(b) The player then converts the ID information signal IDS to an identification information signal IDINF in a format suitable for transmission over the Internet 30, and then outputs the identification information signal IDINF over the Internet 30 to the server 60 (S32). If the server 60 authenticates the optical disc 3, the server 60 returns the encryption key K to the optical disc drive 20.

(c) The player then detects the address of the damaged part of the digital content (such as a video program) recorded to the optical disc 3 (S33). More specifically, if the damage (indicated by an X on the optical disc 3 shown in FIG. 8) is detected while playing back the video program, the address where the damage starts and the length of the data that is actually unplayable are determined and written to a defect list DL as shown in FIG. 10.

(d) The address information (defect list DL) for the damaged parts of the digital content is then sent over the Internet 30 to the server 60 (S34). Note that this damage address information could be sent to the server 60 together with the above identification information.

(e) If the server 60 determines from the ID information that the optical disc 3 is authentic, the server 60 returns a supplementary information signal SPIC for correcting the damaged part to the player (S35). This supplementary information signal SPIC is supplied from the content provider and stored on the server 60, and as shown in FIG. 10 only the necessary parts are extracted from the complete program information stored on the server 60 and returned to the player. The returned supplementary information signal SPIC thus contains correction data of the specified length for the address of the damaged part identified from the defect list DL.

(f) The player then corrects the damaged part of the digital content recorded to the optical disc 3 using this supplementary information signal SPIC (S36). The selector 23 of the optical disc drive 20 switches between the video program signal PIC reproduced from the optical disc 3 and the supplementary information signal SPIC returned from the server 60 based on the content address information that is updated in real-time as the disc is read, and passes the selected signal to the downstream descrambler 22. The decoder 24 then decodes and outputs the content.

In addition to protecting the digital content by determining whether an optical disc is an authorized copy based on the ID information signal IDS, this embodiment of the invention can also provide a data correction service for correcting the digital content in damaged parts of the optical disc 3.

This embodiment of the invention has been described as detecting defects, generating a defect list DL, and acquiring correction data from the server 60 in real time, but the invention shall not be so limited. A buffering process could also be injected to the process for correcting a defective sequence. The video content signal PIC could also be read at high speed from the optical disc 3 and buffered to a hard disk or other storage medium disposed to the optical disc drive 20, and the defective parts of the content could then be patched using the supplementary information signal SPIC from the server.

Figure 11:
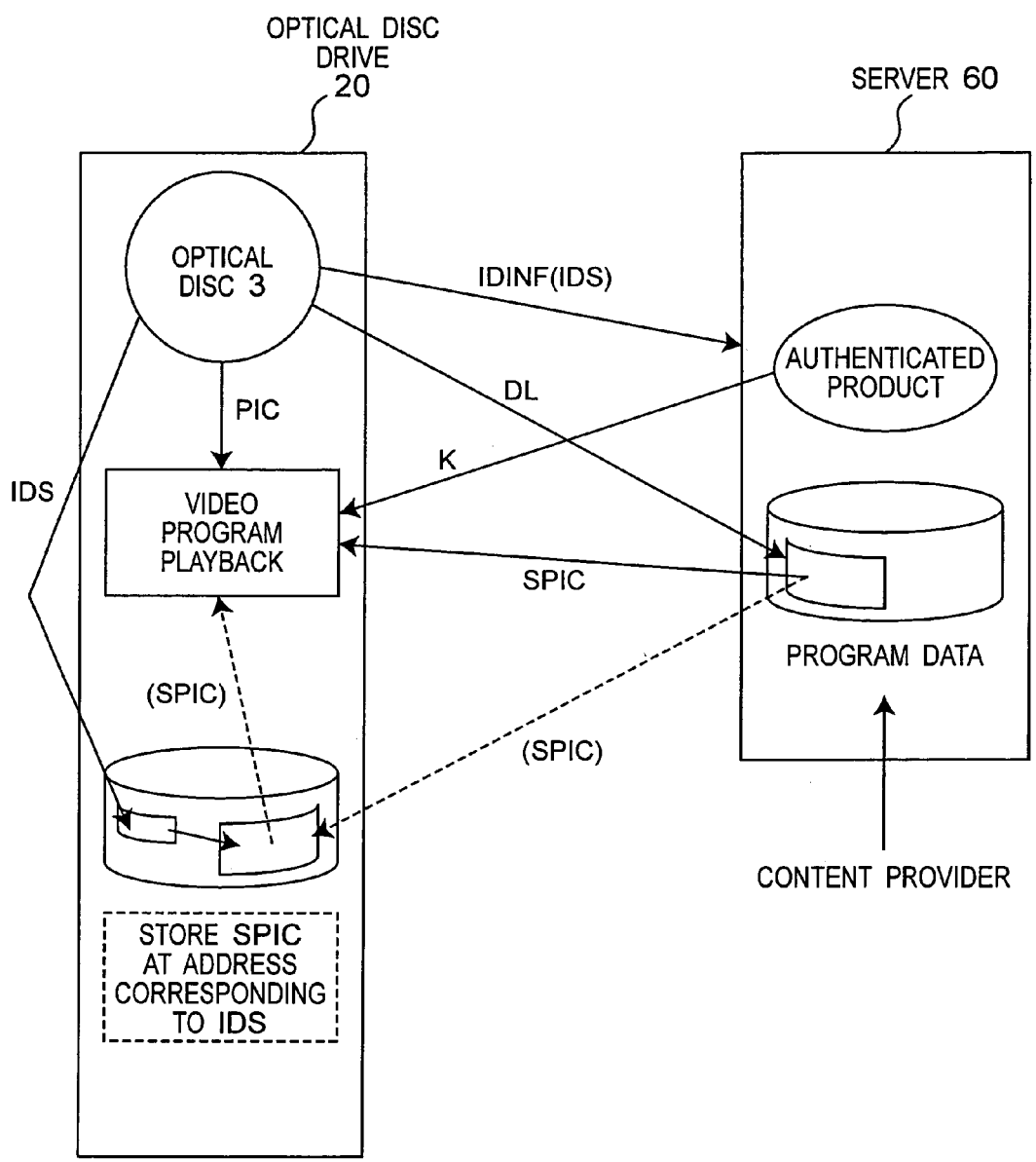
FIG. 11 is a schematic diagram describing the operation of a server system according to a second embodiment of the present invention.

The supplementary information signal SPIC could alternatively be acquired and written to a specific address on the foregoing hard disk before playing the video program from the optical disc 3 (see FIG. 11). For example, a table for generating addresses corresponding uniformly to the ID information signal IDS could be kept on the hard disk, and the supplementary information signal SPIC then recorded to the data areas with the corresponding address. Once the supplementary information signal SPIC is acquired from the server 60, this method enables playing the digital content from the optical disc 3 without repeatedly accessing the server 60 because the supplementary information signal SPIC can be accessed directly from the local hard disk. This arrangement does not require that the digital content is being played from the optical disc 3 when the server 60 is first accessed, that is, all tracks on the optical disc 3 need not have been scanned when the server 60 is accessed. For example, the defect list DL can be compiled in a short time during the media certification process, for example, and sent to the server 60 to acquire and locally store the supplementary information signal SPIC. Note that this media certification process indicates a function for detecting defects by rapidly scanning tracks at an interval of some multiple number of tracks without reproducing data other than the address data.

This embodiment of the invention does not require only using an IC tag unit to verify the authenticity of an optical disc 3. A tamperproof barcode or magnetic tape to which the identification information is recorded could alternatively be affixed to the optical disc, for example.

An IC tag unit, identification system for products bearing an IC tag unit, and optical disc drive, and a digital contents management method according to the present invention enabling managing individual optical discs over the Internet at low cost, and thus enable safely supplying high quality video content to users. Our invention thus offers particularly high utility and benefit in the on-line distribution of video and other digital content. This invention can also be used in the distribution of computer software and programs protected by copyright.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An IC tag unit comprising:
   an IC unit operable to store unique identification information;
   a first coil operable to produce a first induction current by electromagnetic induction resulting from movement relative to a magnetic field in which north and south poles are separated by a specific distance;
   a first rectifier operable to produce a first rectified current by rectifying the first induction current; and
   a regulator operable to generate a specific voltage from the first rectified current and supplying said voltage to the IC unit.

2. An IC tag unit according to claim 1, wherein the first coil generates the first induction current at a frequency of 100 kHz or less as a result of relative movement at a rate of $(10^5 \times d)$ [mm/s] or less through a magnetic field in which north and south poles are separated distance d [mm].

3. An IC tag unit according to claim 1, wherein the first coil functions as an antenna for transmitting signals based on identification information stored in the IC unit.

4. An IC tag unit according to claim 3, wherein the IC unit transmits a signal based on identification information stored in the IC unit at a frequency of 10 MHz or greater using the first coil as an antenna.

5. An IC tag unit according to claim 1, further comprising a second coil disposed at a specific center-to-center distance from the first coil for producing a second induction current by means of electromagnetic induction resulting from movement relative to a magnetic field; and
   a second rectifier operable to rectify the second induction current and outputting a second rectified current;
   wherein the regulator generates a specific voltage from a current combining the first rectified current and second rectified current, and supplies said voltage to the IC unit.

6. An IC tag unit according to claim 5, wherein the second coil generates a second induction current at a frequency of 100 kHz or less as a result of relative movement at a rate of $(10^5 \times d)$ [mm/s] or less through a magnetic field in which north and south poles are separated distance d [mm].

7. An IC tag unit according to claim 5, wherein the phase difference between the first induction current output from the first coil and the second induction current output from the second coil is in the range $(180° \times n + 45°)$ to $(180° \times n + 135°)$ where n is an integer.

8. An IC tag unit according to claim 5, wherein the phase difference between the first induction current output from the first coil and the second induction current output from the second coil is effectively $(180° \times n + 90°)$ where n is an integer.

9. An IC tag unit according to claim 5, wherein the center-to-center distance T [mm] between the first coil and second coil is in the range $$(n+1/6) \times d <= T <= (n+5/6) \times d$$

where d [mm] is the distance between north and south poles in the magnetic field and n is an integer.

10. An IC tag unit according to claim 5, wherein the center-to-center distance T [mm] between the first coil and second coil is in the range $$(n+1/4) \times d <= T <= (n+3/4) \times d$$

where d [mm] is the distance between north and south poles in the magnetic field and n is an integer.

11. An IC tag unit according to claim 5, wherein the center-to-center distance T [mm] between the first coil and second coil is in the range $$(n+1/3) \times d <= T <= (n+2/3) \times d$$

where d [mm] is the distance between north and south poles in the magnetic field and n is an integer.

12. An IC tag unit according to claim 1, wherein the regulator is composed of a plurality of diodes connected in series.

13. An optical disc comprising an IC tag unit according to claim 1.

14. A product identification system comprising a spindle motor for rotating a product having an IC tag unit; and
    a static magnetic field generating means disposed with north and south poles alternating in a circumferential direction near a rotating surface of the product.

15. A product identification system according to claim 14, wherein the static magnetic field generating means contains at least one magnet with a pair of north and south poles.

16. A product identification system according to claim 14, wherein the static magnetic field generating means contains a plurality of magnets arranged with north and south poles alternating in the circumferential direction adjacent to the rotating surface.

17. A product identification system according to claim 14 for identifying a product having an IC tag unit comprising an IC unit, a first coil, and a second coil, wherein:
    the distance d [mm] between the north and south poles of the static magnetic field generating means is in the range $$T/(n+5/6) <= d <= T/(n+1/6)$$

where T [mm] is the center-to-center distance between the first coil and second coil, and n is an integer.

18. A product identification system according to claim 14 for identifying a product having an IC tag unit comprising an IC unit, a first coil, and a second coil, wherein:
    the distance d [mm] between the north and south poles of the static magnetic field generating means is in the range $$T/(n+3/4) <= d <= T/(n+1/4)$$

where T [mm] is the center-to-center distance between the first coil and second coil, and n is an integer.

19. A product identification system according to claim 14 for identifying a product having an IC tag unit comprising an IC unit, a first coil, and a second coil, wherein:
    the distance d [mm] between the north and south poles of the static magnetic field generating means is in the range $$T/(n+2/3) <= d <= T/(n+1/3)$$

where T [mm] is the center-to-center distance between the first coil and second coil, and n is an integer.

20. A product identification system according to claim 14, further comprising a reception means for receiving a wireless signal transmitted from the IC tag unit.

21. A product identification system according to claim 14, wherein the spindle motor rotates at a speed of $$((10^5 \times d)/(2\pi r))\ \text{revolutions per second or less}$$

where r [mm] is the radius from the center of rotation to the north and south poles of the magnetic field, and d [mm] is the distance between the north and south poles.

22. An optical disc drive comprising a product identification system according to claim 14, wherein the product is an optical disc.

23. A product identification method for identifying products having an IC tag unit comprising an IC unit for storing unique identification information, and a power supply unit operable to supply power to the IC unit by electromagnetic induction, the product identification method comprising:
    generating power by electromagnetic induction unit in the power supply unit of the IC tag unit by moving the product relative to a magnetic field in which north and south poles are separated distance d [mm] at a rate of $(10^5 \times d)$ [mm/s] or less, and transmitting the identification information from the IC unit; and
    receiving the identification information.

24. A product identification method for identifying products having an IC tag unit comprising an IC unit for storing unique identification information, and first and second coils disposed a specific center-to-center distance apart and functioning as a power supply unit operable to supply power to the IC unit by electromagnetic induction, the product identification method comprising:
    generating first and second induction currents of different phase in the first and second coils by moving the product relative to a magnetic field in which north and south poles are separated distance d [mm] at a rate of $(10^5 \times d)$ [mm/s] or less;
    rectifying and adding the first and second induction currents, applying a specific voltage generated from the combined current to the IC unit, and transmitting the identification information from the IC unit; and
    receiving the identification information.

25. A digital content management method for managing digital content recorded to an optical disc based on identification information uniquely identifying a circulated optical disc by means of an optical disc drive for driving the optical disc, said digital content management method comprising:
    acquiring the identification information from an IC tag unit affixed to the optical disc;
    sending the identification information to a digital content management server;
    acquiring an encryption key sent from the server for decrypting the digital content; and
    decoding digital content recorded to the optical disc using the encryption key.

26. A digital content management method for managing digital content recorded to an optical disc based on identification information uniquely identifying a circulated optical disc by means of an optical disc drive for driving the optical disc, said digital content management method comprising:
    acquiring the identification information from an IC tag unit affixed to the optical disc;
    sending the identification information to a digital content management server;
    detecting address information relating to defective parts of the digital content recorded to the optical disc;
    sending the address information relating to defective parts of the digital content to the server;
    receiving correction data sent from the server for correcting the defective part when the server authenticates the optical disc based on the identification information; and
    correcting the digital content recorded to the optical disc using the correction data.

27. A digital content management method according to claim 25, wherein:
    the IC tag unit comprises
        an IC unit operable to store unique identification information;
        a first coil operable to produce a first induction current by electromagnetic induction resulting from movement relative to a magnetic field in which north and south poles are separated by a specific distance;

a first rectifier operable to rectify the first induction current; and a regulator operable to generate a specific voltage from the first rectified current rectified by the first rectifier, and supplying said voltage to the IC unit; and the acquiring the identification information from the IC tag unit comprises:

moving the optical disc relative to the magnetic field and generating a first induction current by electromagnetic induction in the first coil of the IC tag unit, applying the specific voltage to the IC unit, and transmitting the identification information from the IC unit; and receiving the identification information.

* * * * *